United States Patent [19]

Freiberg

[11] 3,725,385

[45] Apr. 3, 1973

[54] PROCESS FOR THE DEMETHYLATION OF 3-AMINO MACROLIDES

[75] Inventor: Leslie Alan Freiberg, Waukegan, Ill.

[73] Assignee: Abbott Laboratories, North Chicago, Ill.

[22] Filed: Nov. 2, 1970

[21] Appl. No.: 86,314

[52] U.S. Cl. ......................... 260/210 AB, 260/210 E
[51] Int. Cl. ............................................. C07c 129/18
[58] Field of Search ..................... 260/210 E, 210 AB

[56] References Cited

UNITED STATES PATENTS

| | | | |
|---|---|---|---|
| 2,812,323 | 11/1957 | Flynn et al. | 260/210 E |
| 3,583,972 | 6/1971 | Birkenmeyer et al. | 260/210 E |

OTHER PUBLICATIONS

Chambers et al. "Chem. Abst." Vol. 59, 1963, p. 15197 (b).

*Primary Examiner*—Lewis Gotts
*Assistant Examiner*—Johnnie R. Brown
*Attorney*—Robert L. Niblack

[57] ABSTRACT

The 3-dimethyl amino substituent of the desosamine and mycaminose moieties of macrolide antibiotics are mono- and didemethylated by reaction with halogen, preferably iodine, in the presence of base at a controlled pH. The resulting compounds have antibiotic activity, and furthermore are useful as intermediates for alkylation and the like.

6 Claims, No Drawings

PROCESS FOR THE DEMETHYLATION OF 3-AMINO MACROLIDES

DISCLOSURE OF THE INVENTION

This invention relates to a new and novel process for abstracting one or both methyl groups from the 3-dimethylamino substituent of the 3-amino sugars, desosamine and mycaminose, when they are incorporated within the molecule of a macrolide antibiotic.

The process of this invention is advantageous because the procedure is rapid and straightforward in execution, and furthermore, is generally applicable to the macrolide antibiotics that have the requisite sugar within their molecular structure.

Macrolide antibiotics have molecules comprising complex sugars and macrocyclic lactones. Those incorporating desosamine and mycaminose within their molecular structure and hence suitable for use in the reaction process hereinafter described, include, for example, erythromycin A, B and C; griesomycin, methymycin, narbomycin, neomethymycin, oleandomycin, pikromycin, plicacetin, carbomycin A and B, spriamycin I, II and III; and leucomycin.

The mono- and didemethylated derivatives of the macrolide antibiotics prepared by the method of this invention themselves have antibiotic activity, although such activity often is less pronounced than is the activity of the parent antibiotic. More importantly, the process is also useful as a means for providing intermediates that can further be reacted as for example by alkylation or acylation and the like to provide derivatives of the antibiotic that are thus substituted on the 3-amino nitrogen. This is especially useful for introducing radioactive carbon 14 into the 3'-amino substituent to study the in vivo course of the antibiotic.

According to the method of this invention, the antibiotic containing the desosamine or mycaminose moiety is reacted with from one to five equivalents of a halogen selected from the group consisting of iodine, and bromine, in the presence of a suitable base and in an inert solvent.

A suitable base is one which will neither reduce the reactive species of the halogen, nor react at any appreciable rate with the aglycone portion of the macrolide. Examples of suitable bases include alkali hydroxide, alkali methoxide and the alkali salts of carboxylic acids such as sodium acetate, propionate, and benzoate. Although alkali methoxide has been found to be a suitable base, as has alkali t-butoxide, the use of alkali ethoxide is not recommended as it readily reduces the halogen, diverting it from the demethylation reaction.

The lactone or aglycone ring portion of macrolide antibiotics is known to be relatively stable in the pH range from 5 to 9, and under the conditions of the reaction herein disclosed is stable in the pH range of 8 to 9. At a pH in excess of 9, however, and especially at 10 or higher, hydrolysis or alcoholysis may begin to be a serious side reaction. Therefore, with strong bases, such as alkali methoxide, it is recommended that a temperature below 5° C, a minimum amount of base (two to four equivalents), and a short reaction time be employed.

The weaker bases such as sodium acetate and benzoate, while still effective in the demethylation reaction, neither induce premature reduction of the halogen nor degredation of the lactone by the solvent. However, since acid is formed during the course of the demethylation a large excess of a weak base, (10 to 20 equivalents) must be used. Alternatively, three to five equivalents of a weak base may be used and be regenerated by periodic additions of appropriate amount of a strong base to maintain the pH in the range of 8 to 9. Thus with sodium acetate when the pH drifts from the desired limits because of the formation of products, it can be returned to the desired level by addition of sodium hydroxide.

The reaction herein disclosed produces the monodemethylated or didemethylated product predominantly depending on the amount of halogen employed. One equivalent of halogen tends to produce a monodemethylated product, and two equivalents of halogen tends to produce a didemethylated product. A complicating factor is that under certain reaction conditions such as the use of a strong base or high temperature, the solvent may also react with the halogen. Therefore, halogen in excess of the theoretical amounts are in such instances necessary for complete reaction. This is, however, a significant factor only with the strong bases.

The reaction is carried out in an inert solvent. By inert solvent, it is meant one which will dissolve the reactants at least partially and yet not react with them. Some suitable solvents include methanol, dioxane, aqueous dioxane, tetrahydrofurane, aqueous tetrahydrofurane, and dimethylformamide.

There is the problem of reaction of halogen with the solvent system. Because of the potential for such reaction, it is preferred not to use ethanol as a solvent. For reactions conducted at pH 8 to 9, methanol is the preferred solvent. At the lower pH ethanol can be successfully employed and even acetone yields some product.

At a pH of 9 or more, methanol is the preferred solvent, but ethanol and especially acetone are to be avoided, as are other solvents which are known to react at an appreciable rate with halogen at such an elevated pH.

The preferred halogen is iodine, especially so because its rapid reaction in view of the potential degregation of the aglycone ring by whatever base is utilized.

The reaction can be run at a temperature of from −10° to 50° C obtaining very good yields. When run at room temperature, the reaction is complete in from 10–72 hours.

In performing the reaction, the reactants are admixed in the solvent, and the reaction allowed to proceed at a suitable temperature for the desired period. After reaction has progressed the desired time, the reaction mixture is admixed with water and adjusted to an alkaline pH preferably about pH 9 with a base such for example as an alkali hydroxide or ammonium hydroxide. The products comprising a mixture of 3-monodemethylamino macrolide and 3-didemethylamino macrolide are extracted with a suitable solvent such as chloroform. The combined extracts are then washed and the extracting solvent evaporated. The residue of product can then be further purified if desired by recrystallization from a suitable solvent.

The following examples will further serve to illustrate the process of this invention.

EXAMPLE 1

De(N-methyl)Erythromycin A

To a stirred solution of 5.00 g. (6.81 × 10$^{-3}$ mole) of erythromycin A and 4.68 g. (five equivalents) of sodium acetate trihydrate in 50 ml. of 80 percent methanol/water heated to 47° C. in an oil bath was added 1.747 g. (1.0 equivalent) of solid iodine. Then, to maintain the solution in the pH range of 8–9, the following additions of 1N aqueous NaOH were made at the given times: 10 min., 2.0 ml; 30 min., 2.0 ml.; 60 min., 1.0 ml. After 2.0 hours, the mixture was colorless and was poured into 250 ml. of water containing 5.0 ml. of concentrated ammonium hydroxide. The product was extracted with four 50 ml. portions of chloroform. The combined chloroform extracts were washed with 70 ml. of water containing 5.0 ml. of concentrated ammonium hydroxide. The chloroform was dried over anhydrous Na$_2$SO$_4$ and was evaporated to give after drying 4.744 g. of product. The product was dissolved in 12 ml. of acetone and crystallized on addition of 0.7 ml. concentrated NH$_4$OH to give 3.35 g. of product; m.p. 142°–145°; $[\alpha]_D^{25}$ − 64.3° (c.1.00; MeOH).

EXAMPLE 2

De(N-methyl)Erythromycin B

Employing the same procedure, 5.0 g. (6.96 × 10$^{-3}$ mole) of erythromycin B was converted to 4.800 g. of product. The product crystallized on dissolving in 15 ml. of methanol and adding 18 ml. of water containing 1.0 ml. of concentrated NH$_4$OH to give 3.286 g. of de(N-methyl)erythromycin B melting at 129°–132°; $[\alpha]_D^{25}$ − 89,0° (c. 1.00; MeOH).

Analysis Calcd. for C$_{36}$H$_{65}$NO$_{12}$(703.919): C,61.43; H,9.31; N,1.99; O,2727.

Found: C,61.43; H,9.51; N,2.06; O,27.20.

EXAMPLE 3

De(N-methyl)Narbomycin

A mixture of 0.068 mole, one eq. of narbomycin and 1.02 moles, 15 eq. of sodium acetate trihydrate is dissolved in 600 ml. of absolute methanol at 25°–30° C. Then, 0.096 mole, 1.4 eq. of iodine is added and the mixture stirred until homogeneous. After standing for 44 hours at 25°–30° C., the solution is poured into 2,500 ml. of water and the resulting mixture was adjusted to pH 9 with 20 ml. of concentrated ammonium hydroxide. The product is then extracted with four 250 ml. portions of chloroform.

EXAMPLE 4

De(Nemethyl)Neomethymycin

To 200 ml. of absolute methanol is added 0.90 g. (0.0391 mole) of sodium metal to prepare 0.039 moles; 2.9 eq. of sodium methoxide. After reaction is complete, the solution is cooled in an ice-bath and purged with nitrogen for 30 minutes. Then, 0.0136 mole; one eq. of neomethymycin is added followed by 3.85 g. (0.015 mole; 1.1 eq.) of iodine. The mixture is stirred for 5.5 hours at 0°–5° C. under nitrogen. After that time, the mixture is poured into 100 ml. of water made basic with 5.0 ml. of concentrated ammonium hydroxide. The product is extracted with four 100 ml. portions of chloroform. The combined chloroform extracts are washed with 100 ml. of water made basic with 5.0 ml. of concentrated NH$_4$OH. The chloroform is dried over anhydrous Na$_2$SO$_4$ and then evaporated in vacuo at 65° C. The crude product is then collected.

EXAMPLE 5

De (N-methyl)Pikromycin

A mixture of 0.0068 mole of pikromycin and (0.0735 mole, 11 eq.) of sodium acetate trihydrate is dissolved in 75 ml. of absolute methanol at 25°–30° C. Then, 0.64 ml. (0.0125 mole; 1.8 eq.) of bromine is added while stirring and the mixture is allowed to stand at 27° C. for 1.5 hours. After that time, the solution is poured into 350 ml. of water. The pH is adjusted to 9 with 2.0 ml. of concentrated ammonium hydroxide and the product is extracted with three 70 ml. portions of chloroform.

EXAMPLE 6

De(N-methyl)Griesomycin

A mixture of 0.0298 mole of sodium acetate trihydrate and 0.00273 mole of griesomycin is dissolved in a mixture of 32 ml. of N,N-dimethylacetamide (D-MAC) and 15 ml of water. Then, 0.00316 mole of iodine is added and the mixture stirred until homogeneous. The solution is allowed to stand at 25°–30° C. for 48 hours. The solution is then diluted with 200 ml. of water made basic with 2.0 mol of concentrated ammonium hydroxide. The product is extracted with four 30 ml. portions of chloroform.

EXAMPLE 7

De(N-methyl)-4-Hydroxyerythromycin A

A mixture of 0.0295 mole of sodium acetate trihydrate and 0.00273 mole of 4-hydroxyerythromycin A obtained as set forth in U.S. Pat. application Ser. No. 14,681, filed Feb. 26, 1970, and now abandoned, is dissolved in a mixture of 34 ml. of dimethylacetamide and 14 ml. of water. Then, 0.0033 mole of bromine is added with stirring and the solution is allowed to stand at 25°–30° C. for 24 hours. The solution is then poured into 200 ml. of water to which has been added 2.0 ml. of concentrated ammonium hydroxide. The product is extracted with four 30 ml. portions of chloroform and purified.

EXAMPLE 8

De(N-methyl)Erythromycin B

To a stirred mixture of 5.00 g. (0.007 mole) of erythromycin B and 14.0 g. (0.103 mole) of sodium acetate trihydrate in 75 ml. of methanol was added 2.5 g. (0.01 mole) of iodine. The mixture was stirred a few hours and then allowed to stand for 5 days at 25°–30° C. The reaction mixture was poured into 500 ml. of water to which had been added 3.0 ml. of concentrated ammonium hydroxide. The product was extracted with three 50 ml. portions of chloroform. The combined chloroform extracts were washed with 50 ml. of 2 percent sodium thiosulfate solution then with 50 ml. of water. The chloroform was dried over anhydrous sodium sulfate and evaporated at 65° C. in vacuo to leave a residue of crude de(N-methyl)erythromycin B.

Separation of the product from unreacted erythromycin B was accomplished by chromatography using 70 G. of Florisil formed into a column 3 × 20 cm. The column was eluted with 1 liter of benzene: 0.3 percent triethylamine before the sample was added. All eluents contained 0.3 percent triethylamine and fractions were cut at 125 ml. The following fractions were collected: 1–12 (eluent, benzene); 13–20 (eluent, benzene/1 percent methanol); 21–24 (eluent, benzene/2 percent methanol); 25–28 (eluent, benzene/4 percent methanol); 29–34 (eluent, benzene/6 percent methanol). Fractions 21–28 were combined, were dissolved in 20 ml. of ethanol, and were treated with 0.5 g. of Norite A. The Norite A was removed and the ethanol was evaporated to leave 1.23 g. of de(N-methyl)erythromycin B, $[\alpha]_D^{25} - 89.0°$ (c. 1.00; MeOH).

EXAMPLE 9

Bis[de(N-methyl)]Erythromycin A

In a 500 ml. flask was placed 300 ml. of absolute methanol. The solvent was purged with nitrogen for 20 minutes. Then, 0.648 g. of sodium metal was added and allowed to react. When the sodium was consumed, the solution was cooled to 0°–5° C. in an ice-bath. Then, 4.00 g. of de(N-methyl)erythromycin A was added and when dissolved, 7.08 g. of iodine was also added. The solution was stirred at 0°–5° C. under nitrogen for 4 hours. The solution was then poured into 1,500 ml. of water to which had been added 12 g. of sodium thiosulfate and 10 ml. of concentrated ammonium hydroxide. The resulting mixture was extracted with two 100 ml. and two 50 ml. portions of chloroform. The combined chloroform extracts were washed with 100 ml. of water made basic with 5 ml. of concentrated ammonium hydroxide. The chloroform was dried over anhydrous sodium sulfate and evaporated in vacuo at 65° C. The product, bis[ de(N-methyl)]erythromycin A weighed 3.40 g. Thin layer chromatography revealed a purity of >95 percent. Prior to elemental analysis, the sample was twice dissolved in ethanol and evaporated to dryness to remove retained chloroform. Crystals were obtained in 25 percent yield from absolute ethanol, m.p. 223°–225° C.; $[\alpha]_D^{25} - 72.9°$ (c. 1.00; MeOH).

Analysis Calcd. for $C_{35}H_{63}NO_{13}$(705.891): C,59.55; H,9.00; N,1.98; O,29.47
Found: C,59.40; H,9.00; N,1.88; O,29.65.

EXAMPLE 10

De(N-methyl)Oleandomycin

A mixture of 0.06 mole of sodium acetate trihydrate and 0.006 mole of oleandomycin is dissolved in a mixture of 66 ml. of N,N-dimethylacetamide and 32 ml. of water. Then 0.006 mole of iodine is added and the mixture stirred until homogenous. The solution is then allowed to remain at 25°–30° C. for 40 hours. During this time, the pH is maintained between 8 and 9 by the addition of more sodium hydroxide as needed.

The product is extracted from the basic mixture with from 30 ml. portions of chloroform. The combined extracts are then washed with 20 ml. of 10 percent aqueous sodium thiosulfate and then with a mixture of 50 ml. of water and 2.0 ml. concentrated ammonium hydroxide. The organic layer is dried over anhydrous sodium sulfate. The chloroform was evaporated and the residue collected, redissolved in acetone and then crystallized by the addition of 0.4 ml. of concentrated ammonium hydroxide.

EXAMPLE 11

Bis De(N-methyl)Oleandomycin 0.028 moles of sodium methoxide prepared as in Example 9 is added 0.0055 moles of de(N-methyl)Oleandomycin. When this is dissolved 0.028 moles of iodine is added. The solution is stirred at 0°–5° C. under nitrogen for 4 hours. The reaction mixture is then poured into 1.5 l. of water to which has been added 12g. of sodium thiosulfate and 10 ml. concentrated ammonium hydroxide. The resulting mixture was extracted with chloroform, the chloroform extracts washed with water and then dried over anhydrous sodium sulfate. The chloroform from the extracts is then evaporated in vacuo at 65° C.

What is claimed is:

1. The method of demethylating the 3-dimethylamino substituent of mycaminose or desosamine when either sugar is a moiety of a macrolide antibiotic consisting essentially of reacting the macrolide antibiotic with a halogen selected from the group consisting of iodine and bromine in the presence of an inert solvent and sufficient base to maintain the pH from about 8 to about 10 during the course of the reaction, said base being selected from the group consisting of alkali hydroxides, alkali methoxides and the alkali salts of carboxylic acids.

2. The method according to claim 1 in which the base is sodium methoxide.

3. The method according to claim 1 in which the base is sodium acetate.

4. The method according to claim 1 in which the pH is maintained within the range of about pH 8 to 9 by the addition of increments of base during the course of the reaction.

5. The method according to claim 1 where the halogen is iodine.

6. The method according to claim 1 in which one to five equivalents of halogen is employed for each equivalent of macrolide antibiotic.

* * * * *